(12) United States Patent
Phillips et al.

(10) Patent No.: US 8,167,769 B2
(45) Date of Patent: *May 1, 2012

(54) GEAR AND CLUTCH ARRANGEMENT FOR MULTI-SPEED TRANSMISSION

(75) Inventors: Andrew W. Phillips, Saline, MI (US);
Clinton E. Carey, Monroe, MI (US);
Scott H. Wittkopp, Ypsilanti, MI (US);
James M. Hart, Belleville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 874 days.

This patent is subject to a terminal disclaimer.

(21) Appl. No.: 12/180,189

(22) Filed: Jul. 25, 2008

(65) Prior Publication Data

US 2009/0118067 A1 May 7, 2009

Related U.S. Application Data

(60) Provisional application No. 60/984,538, filed on Nov. 1, 2007.

(51) Int. Cl.
*F16H 3/62* (2006.01)
*F16H 3/44* (2006.01)

(52) U.S. Cl. .................. 475/323; 475/324; 475/275
(58) Field of Classification Search .......... 475/275–292, 475/296, 297, 302, 303, 311–313, 317–319, 475/323–325
See application file for complete search history.

(56) References Cited

U.S. PATENT DOCUMENTS

| | | | |
|---|---|---|---|
| 7,462,125 B2 * | 12/2008 | Wittkopp et al. | 475/276 |
| 7,731,622 B2 * | 6/2010 | Wittkopp et al. | 475/275 |
| 7,815,540 B2 * | 10/2010 | Phillips et al. | 475/269 |
| 7,824,304 B2 * | 11/2010 | Phillips et al. | 475/323 |
| 7,833,121 B2 * | 11/2010 | Carey et al. | 475/275 |
| 7,833,122 B2 * | 11/2010 | Phillips et al. | 475/275 |
| 2007/0184933 A1 * | 8/2007 | Maguire et al. | 475/275 |
| 2009/0023538 A1 * | 1/2009 | Carey et al. | 475/275 |

* cited by examiner

*Primary Examiner* — Tisha Lewis

(57) ABSTRACT

A transmission is provided having an input member, an output member, three planetary gear sets, a plurality of coupling members and a plurality of torque transmitting devices. Each of the planetary gear sets includes a sun gear member, a planet carrier member, and a ring gear member. The torque transmitting devices include five clutches and one brake arranged within a transmission housing.

18 Claims, 1 Drawing Sheet

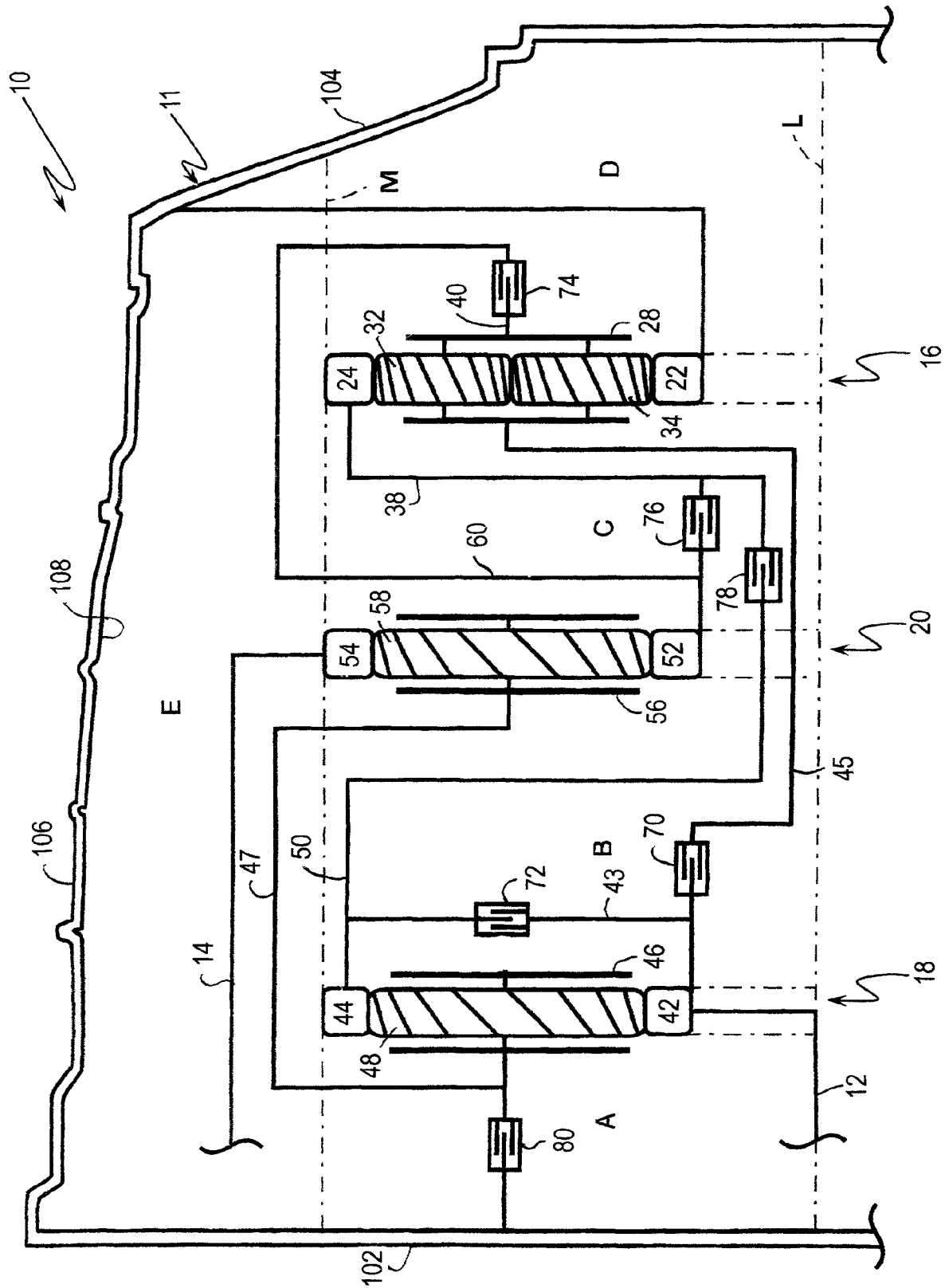

GEAR AND CLUTCH ARRANGEMENT FOR MULTI-SPEED TRANSMISSION

CROSS-REFERENCE TO RELATED APPLICATIONS

This application claims the benefit of U.S. Provisional Application No. 60/984,538, filed on Nov. 1, 2007, which is hereby incorporated in its entirety herein by reference.

FIELD

The invention relates generally to a multiple speed transmission having a plurality of planetary gear sets and a plurality of torque transmitting devices and more particularly to a transmission having eight or more speeds, three planetary gear sets and a plurality of torque transmitting devices.

BACKGROUND

The statements in this section merely provide background information related to the present disclosure and may or may not constitute prior art.

Automatic power transmissions are currently in widespread use in passenger vehicles and trucks. As is well known, the automatic transmission provides a plurality of speed ratios in the forward direction and at least one speed ratio in the reverse direction. The speed ratios are established through the use of a plurality of planetary gearsets. The engagement of the gearsets is controlled by a number of fluid-operated torque transmitting mechanisms, for example clutches and brakes.

It has become a standard to provide at least four forward speed ratios in automatic transmissions for use in passenger vehicles. More recently, automobile manufacturers have increased the forward speed ratios to six and in some instances seven or eight. This, of course, requires the addition of planetary gearsets. However, it is desirable to minimize the number of torque transmitting mechanisms to reduce cost and overall size of the transmission.

A number of the currently proposed eight speed planetary transmissions provide three planetary gearsets and six torque-transmitting mechanisms. One problem facing transmission designers and manufacturers is the packaging of the planetary gearsets and the torque-transmitting mechanisms. It is preferable to arrange the gearsets and torque-transmitting mechanisms in a way that minimizes the overall size of the transmission as well as reduces manufacturing complexity.

Therefore, there is a need for a new and improved multi-speed transmission. The arrangement of the gearsets and the torque-transmitting mechanisms of the transmission should minimize the size and manufacturing complexity of the transmission.

SUMMARY

In an aspect of the present invention, a multi-speed transmission is provided. The transmission has an input member, an output member, a transmission housing, a first, second, and third planetary gear set, five clutches and one brake.

The transmission housing has a first wall, a second wall, and a third wall extending between the first and second walls. The second planetary gear set is adjacent the first wall. The first planetary gear set is adjacent second wall. The third planetary gear set is between the first and second planetary gear sets. Each planetary gear set has a sun gear member, a ring gear member and a planet carrier member supporting a plurality of planet gears each configured to intermesh with at least one of the sun gear member and the ring gear member.

The output member is continuously interconnected with the ring gear member of the third planetary gear set. The input member is continuously interconnected with the sun gear member of the second planetary gear set.

The sun gear member of the first planetary gear set is permanently coupled to the transmission housing. The planet carrier member of the second planetary gear set is permanently coupled to the planet carrier member of the third planetary gear set.

The transmission housing has a first area defined radially inward from an outer periphery of the planetary gear sets and axially bounded by the first wall and the second planetary gear set, a second area defined radially inward from the outer periphery of the planetary gear sets and axially bounded by the second and third planetary gear sets, a third area defined radially inward from the outer periphery of the planetary gear sets and axially bounded by the first and third planetary gear sets, a fourth area defined radially inward from the outer periphery of the planetary gear sets and axially bounded by the first planetary gear set and the second wall, and a fifth area defined radially inward from the third wall and radially outward from the outer periphery of the planetary gear sets and axially bounded by the first wall and the second wall.

The first of the five clutches is selectively engageable to interconnect the input member with the planet carrier member of the first planetary gear set. The second of the five clutches is selectively engageable to interconnect the input member with the ring gear member of the second planetary gear set. The third of the five clutches is selectively engageable to interconnect the planet carrier member of the first planetary gear set with the sun gear member of the third planetary gear set. The fourth of the five clutches is selectively engageable to interconnect the ring gear member of the first planetary gear set with the sun gear member of the third planetary gear set. The fifth of the five clutches is selectively engageable to interconnect the ring gear member of the first planetary gear set with the ring gear member of the second planetary gear set. The brake is selectively engageable to interconnect the planet carrier member of the third planetary gear set to the transmission housing.

The first of the five clutches is disposed in at least one of the second and third areas. The second of the five clutches is disposed in at least one of the first and second areas. The third of the five clutches is disposed in at least one of the third, fourth and fifth areas. The fourth of the five clutches is disposed in at least one of the second and third areas. The fifth of the five clutches is disposed in at least one of the second, third and fifth areas. The brake is disposed in at least one of the first, third and fifth areas.

The clutches and the brake are selectively engageable to establish at least eight forward speed ratios and at least one reverse speed ratio between the input member and the output member.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 is a diagram of a cross-section of a transmission according to the principles of the present invention.

DETAILED DESCRIPTION

The following description is merely exemplary in nature and is not intended to limit the present disclosure, application, or uses.

Referring now to FIG. 1, an embodiment of a multi-speed transmission is generally indicated by reference number 10. The transmission 10 includes a transmission housing 11, an input shaft or member 12, and an output shaft or member 14. The input member 12 is preferably connected to an engine (not shown) or to a turbine of a torque converter (not shown). The output member 14 is preferably connected with a final drive unit (not shown) or transfer case (not shown). In the example provided, the output member 14 is located on an axis that is different than a longitudinal axis defined by the input member 12. Accordingly, the output member 14 may exit on a same side of the transmission 10 as the input member 12, thereby providing, for example, a front wheel drive transmission configuration.

The transmission 10 includes a first planetary gear set 16, a second planetary gear set 18, and a third planetary gear set 20. The planetary gear sets 16, 18, and 20 are connected between the input member 12 and the output member 14. In a preferred embodiment of the present invention, the first planetary gear set 16 is a planetary gear set that includes a sun gear member 22, a ring gear member 24 and a carrier member 28 that rotatably supports a set of pinion gears 32, 34. Pinion gears 32, 34 are configured to intermesh with each other, sun gear member 22 and ring gear member 24. Moreover, sun gear member 22 is fixedly connected to the transmission housing 11 of the transmission 10 for preventing rotation of sun gear member 22. Ring gear member 24 is connected for common rotation with a first interconnecting shaft or member 38. Carrier member 28 is connected for common rotation with a second interconnecting shaft or member 40 and a third interconnecting shaft or member 45.

The second planetary gear set 18 includes a sun gear member 42, a ring gear member 44 and a carrier member 46 that rotatably supports a set of pinion gears 48. Pinion gears 48 are configured to intermesh with both sun gear member 42 and ring gear member 44. Sun gear member 42 is connected for common rotation with the input member 12 and a fourth interconnecting shaft or member 43. Carrier member 46 is connected for common rotation with a fifth interconnecting shaft or member 47. Ring gear member 44 is connected for common rotation with a sixth interconnecting shaft or member 50.

The third planetary gear set 20 includes a sun gear member 52, a ring gear member 54 and a carrier member 56 that rotatably supports a set of pinion gears 58. Pinion gears 58 are configured to intermesh with both sun gear member 52 and ring gear member 54. Sun gear member 52 is connected for common rotation with a seventh interconnecting shaft or member 60. Ring gear member 54 is connected for common rotation with the output member 14. Carrier member 56 is connected for common rotation with the fifth interconnecting member 47.

The transmission 10 includes a variety of torque-transmitting mechanisms or devices including a first clutch 70, a second clutch 72, a third clutch 74, a fourth clutch 76, a fifth clutch 78, and a brake 80. The first clutch 70 is selectively engagable to connect the fourth interconnecting member 43 with the third interconnecting member 45. The second clutch 72 is selectively engagable to connect the fourth interconnecting member 43 with the sixth interconnecting member 50. The third clutch 74 is selectively engagable to connect the second interconnecting member 40 with the seventh interconnecting member 60. The fourth clutch 76 is selectively engagable to connect the first interconnecting member 38 to the seventh interconnecting member 60. The fifth clutch 78 is selectively engagable to connect the first interconnecting member 38 to the sixth interconnecting member 50. The brake 80 is selectively engagable to connect carrier member 46 to the transmission housing 11 to restrict rotation of carrier member 46.

The transmission 10 is capable of transmitting torque from the input member 12 to the output member 14 in preferably at least eight forward torque ratios and two reverse torque ratios. Each of the forward torque ratios and the reverse torque ratios are attained by engagement of one or more of the torque-transmitting mechanisms (i.e. first clutch 70, second clutch 72, third clutch 74, fourth clutch 76, fifth clutch 78, and brake 80). Those skilled in the art will readily understand that a different speed ratio is associated with each torque ratio. Thus, eight forward speed ratios may be attained by the transmission 10.

The transmission housing 11 includes a first end wall 102, a second end wall 104, and a third wall 106. The third wall 106 interconnects between the first and second end walls 102 and 104 to provide a space or cavity 108 in which the planetary gear sets 16, 18, and 20 and the torque-transmitting mechanisms 70, 72, 74, 76, 78, and 80 are located. Further, the cavity 108 has a plurality of areas or Zones A, B, C, D, and E in which the plurality of torque transmitting mechanisms 70, 72, 74, 76, 78, and 80 are specifically positioned, in accordance with the preferred embodiments of the present invention.

As shown in FIG. 1, Zone A is defined by the area or space bounded: axially on the left by the first end wall 102, on the right by planetary gear set 18, radially inward by a reference line "L" which is a longitudinal line that is axially aligned with the input shaft 12, and radially outward by a reference line "M" which is a longitudinal line that extends adjacent an outer diameter or outer periphery of the planetary gear sets 16,18, and 20. While reference line "M" is illustrated as a straight line, it should be appreciated that reference line "M" follows the outer periphery of the planetary gear sets 16, 18, and 20, and accordingly may be stepped or non-linear depending on the location of the outer periphery of each of the planetary gear sets 16,18, and 20. Zone B is defined by the area bounded: axially on the left by planetary gear set 18, axially on the right by planetary gear set 20, radially outward by reference line "M", and radially inward by reference line "L". Zone C is defined by the area bounded: axially on the left by planetary gear set 20, axially on the right by planetary gear set 16, radially outward by reference line "M", and radially inward by reference line "L". Zone D is defined by the area bounded: axially on the left by planetary gear set 16, axially on the right by the second end wall 104, radially outward by reference line "M", and radially inward by reference line "L". Zone E is defined by the area bounded: axially on the left by the first end wall 102, axially on the right by the second end wall 104, radially inward by reference line "M" and radially outward by the third wall 106.

The torque transmitting mechanisms 70, 72, 74, 76, 78, and 80 are intentionally located within specific Zones in order to provide advantages in overall transmission size, packaging efficiency, and reduced manufacturing complexity. In the particular example shown in FIG. 1, the torque transmitting mechanism 80 is in Zone A, the torque transmitting mechanisms 70 and 72 are in Zone B, the torque transmitting mechanisms 76 and 78 are in Zone C and the torque transmitting mechanism 74 is in Zone D.

However, the present invention contemplates other embodiments where the torque transmitting mechanisms 70, 72, 74, 76, 78, and 80 are disposed in the other Zones. The feasible locations of the torque-transmitting devices 70, 72, 74, 76, 78, and 80 relative to the Zones are illustrated in Chart 1. An "X" in the chart indicates that the present invention contemplates locating the particular torque transmitting device in the referenced Zones. An "O" in the chart indicates that the present invention contemplates that it is not feasible to locate the particular torque transmitting device in the referenced Zone.

CHART 1

| TORQUE TRANSMITTING DEVICES | ZONE A | ZONE B | ZONE C | ZONE D | ZONE E |
|---|---|---|---|---|---|
| 80 | X | O | X | O | X |
| 78 | O | X | X | O | X |
| 76 | O | X | X | O | O |
| 74 | O | O | X | X | X |
| 70 | O | X | X | O | O |
| 72 | X | X | O | O | O |

For example, the present invention provides that brake 80 may be located in Zones A, C, or E, but may not be located in Zones B or D. It should be appreciated that each of the torque transmitting devices 70, 72, 74, 76, 78, and 80 may be located in a permissible Zone, as indicated in Chart 1, independently of the location of any of the other torque transmitting devices 70, 72, 74, 76, 78, and 80.

The description of the invention is merely exemplary in nature and variations that do not depart from the gist of the invention are intended to be within the scope of the invention. Such variations are not to be regarded as a departure from the spirit and scope of the invention.

The invention claimed is:

1. A transmission comprising:
an input member;
an output member;
a transmission housing having a first wall, a second wall, and a third wall extending between the first and second walls;
a first, second and third planetary gear set disposed within the transmission housing, wherein the second planetary gear set is adjacent the first wall, the first planetary gear set is adjacent the second wall, and the third planetary gear set is between the first and second planetary gear sets, each planetary gear set having a sun gear member, a ring gear member and a planet carrier member supporting a plurality of planet gears each configured to intermesh with at least one of the sun gear member and the ring gear member, wherein the output member is continuously interconnected with the ring gear member of the third planetary gear set, wherein the input member is continuously interconnected with the sun gear member of the second planetary gear set, wherein the sun gear member of the first planetary gear set is permanently coupled to the transmission housing, wherein the planet carrier member of the second planetary gear set is permanently coupled to the planet carrier member of the third planetary gear set, and;
wherein the transmission housing has a first area defined radially inward from an outer periphery of the planetary gear sets and axially bounded by the first wall and the second planetary gear set, a second area defined radially inward from the outer periphery of the planetary gear sets and axially bounded by the second and third planetary gear sets, a third area defined radially inward from the outer periphery of the planetary gear sets and axially bounded by the first and third planetary gear sets, a fourth area defined radially inward from the outer periphery of the planetary gear sets and axially bounded by the first planetary gear set and the second wall, and a fifth area defined radially inward from the third wall and radially outward from the outer periphery of the planetary gear sets and axially bounded by the first wall and the second wall;
a first clutch selectively engageable to interconnect the input member and the sun gear member of the second planetary gear set with the planet carrier member of the first planetary gear set;
a second clutch selectively engageable to interconnect the input member and the sun gear member of the second planetary gear set with the ring gear member of the second planetary gear set;
a third clutch selectively engageable to interconnect the planet carrier member of the first planetary gear set with the sun gear member of the third planetary gear set;
a fourth clutch selectively engageable to interconnect the ring gear member of the first planetary gear set with the sun gear member of the third planetary gear set;
a fifth clutch selectively engageable to interconnect the ring gear member of the first planetary gear set with the ring gear member of the second planetary gear set;
a brake selectively engageable to interconnect the planet carrier member of the third planetary gear set to the transmission housing;
wherein the first clutch is disposed in one of the second and third areas, the second clutch is disposed in one of the first and second areas, the third clutch is disposed in one of the third, fourth and fifth areas, the fourth clutch is disposed in one of the second and third areas, the fifth clutch is disposed in one of the second, third and fifth areas, and the brake is disposed in one of the first, third and fifth areas; and
wherein the clutches and the brake are selectively engageable to establish at least eight forward speed ratios and at least one reverse speed ratio between the input member and the output member.

2. The transmission of claim 1 wherein the first clutch is disposed in the second area, the second clutch is disposed in the second area, the third clutch is disposed in the fourth area, the fourth clutch is disposed in the third area, the fifth clutch is disposed in the third area, and the brake is disposed in the first area.

3. The transmission of claim 1 wherein the first clutch is disposed within the second area.

4. The transmission of claim 1 wherein the first clutch is disposed within the third area.

5. The transmission of claim 1 wherein the second clutch is disposed within the first area.

6. The transmission of claim 1 wherein the second clutch is disposed within the second area.

7. The transmission of claim 1 wherein the third clutch is disposed within the third area.

8. The transmission of claim 1 wherein the third clutch is disposed within the fourth area.

9. The transmission of claim 1 wherein the third clutch is disposed within the fifth area.

10. The transmission of claim 1 wherein the fourth clutch is disposed within the second area.

11. The transmission of claim 1 wherein the fourth clutch is disposed within the third area.

12. The transmission of claim 1 wherein the fifth clutch is disposed within the second area.

13. The transmission of claim 1 wherein the fifth clutch is disposed within the third area.

14. The transmission of claim 1 wherein the fifth clutch is disposed within the fifth area.

15. The transmission of claim 1 wherein the brake is disposed within the first area.

16. The transmission of claim 1 wherein the brake is disposed within the third area.

17. The transmission of claim 1 wherein the brake is disposed within the fifth area.

18. The transmission of claim 1 wherein the first planetary gear set has a first plurality of pinions and a second plurality of pinions rotatably supported by the planet carrier member wherein the first plurality of pinions intermeshes with the sun gear member and the second plurality of pinions intermeshes with the ring gear member.

* * * * *